(12) United States Patent
Guo et al.

(10) Patent No.: US 9,735,964 B2
(45) Date of Patent: Aug. 15, 2017

(54) FEDERATED REALM DISCOVERY

(75) Inventors: Wei-Qiang Guo, Bellevue, WA (US); Lynn Ayres, Bellevue, WA (US); Rui Chen, Kirkland, WA (US); Sarah Faulkner, Seattle, WA (US); Yordan Rouskov, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1207 days.

(21) Appl. No.: 12/141,939

(22) Filed: Jun. 19, 2008

(65) Prior Publication Data

US 2009/0320114 A1 Dec. 24, 2009

(51) Int. Cl.
*H04L 29/06* (2006.01)
*H04L 9/32* (2006.01)

(52) U.S. Cl.
CPC ................... *H04L 9/3234* (2013.01)

(58) Field of Classification Search
USPC ............................................................ 726/8
See application file for complete search history.

(56) References Cited

U.S. PATENT DOCUMENTS

| | | | |
|---|---|---|---|
| 6,636,894 B1 * | 10/2003 | Short et al. .................... | 709/225 |
| 7,178,163 B2 | 2/2007 | Reeves, Jr. | |
| 7,254,831 B2 | 8/2007 | Saunders et al. | |
| 7,302,634 B2 | 11/2007 | Lucovsky et al. | |
| 7,568,218 B2 | 7/2009 | Garg et al. | |
| 7,698,734 B2 * | 4/2010 | Kupherstein ........... | G06F 21/41 726/10 |
| 8,006,098 B2 | 8/2011 | Aupperle et al. | |
| 8,544,074 B2 | 9/2013 | Guo et al. | |
| 2003/0005163 A1 | 1/2003 | Belzile | |
| 2003/0163733 A1 * | 8/2003 | Barriga-Caceres ..... | G06F 21/33 726/5 |
| 2004/0034774 A1 | 2/2004 | Le Saint | |
| 2004/0230831 A1 | 11/2004 | Spelman et al. | |
| 2005/0114701 A1 | 5/2005 | Atkins et al. | |
| 2005/0204038 A1 * | 9/2005 | Medvinsky et al. .......... | 709/225 |
| 2005/0223217 A1 * | 10/2005 | Howard ................... | G06F 21/31 713/155 |
| 2006/0123472 A1 | 6/2006 | Schmidt et al. | |
| 2006/0248598 A1 | 11/2006 | Johnson et al. | |
| 2006/0288228 A1 | 12/2006 | Botz et al. | |
| 2007/0107048 A1 | 5/2007 | Halls et al. | |

(Continued)

OTHER PUBLICATIONS

Searchnetworking.com (definition of URL (Uniform Resource Locator) last modified on Aug. 9 2000).*

(Continued)

*Primary Examiner* — Harris C Wang
(74) *Attorney, Agent, or Firm* — Workman Nydegger

(57) ABSTRACT

A federated realm discovery system within a federation determines a "home" realm associated with a portion of the user's credentials before the user's secret information (such as a password) is passed to a non-home realm. A login user interface accepts a user identifier and, based on the user identifier, can use various methods to identify an account authority service within the federation that can authenticate the user. In one method, a realm list of the user device can be used to direct the login to the appropriate home realm of the user. In another method, an account authority service in a non-home realm can look up the user's home realm and provide realm information directing the user device to login at the home realm.

14 Claims, 9 Drawing Sheets

(56) References Cited

U.S. PATENT DOCUMENTS

| | | | |
|---|---|---|---|
| 2007/0169171 A1 | 7/2007 | Kumar et al. | |
| 2007/0184819 A1* | 8/2007 | Barriga-Caceres | G06F 21/33 455/411 |
| 2007/0204325 A1 | 8/2007 | Cameron et al. | |
| 2007/0294752 A1 | 12/2007 | Kinser et al. | |
| 2007/0300292 A1 | 12/2007 | Scipioni et al. | |
| 2008/0027788 A1 | 1/2008 | Lawrence et al. | |
| 2008/0072301 A1* | 3/2008 | Chia et al. | 726/8 |
| 2009/0300024 A1 | 12/2009 | Schneider | |
| 2009/0320114 A1* | 12/2009 | Guo | H04L 9/3234 726/8 |
| 2009/0320116 A1 | 12/2009 | Guo | |
| 2014/0026205 A1 | 1/2014 | Guo | |

OTHER PUBLICATIONS

"Achieving Interoperability between Active Directory Federation Services and Shibboleth", Windows server 2003, Date: Feb. 2007, 73 Pages.

"Customizing Client Logon and Home Realm Discovery Pages", Date: 2007, 10 Pages.

"Federated Web SSO Example", Date: Dec. 15, 2006, 7 Pages http://technet2.microsoft.com/windowsserver/en/library/681c5f40-66c5-4404-8fc9-7f66b8608d301033.mspx?mfr=true.

"Using Active Directory Federation Services", pp. 5, http://www.microsoft.com/technet/technetmag/issues/2007/04/InsideMSCOM/default.aspx.

"Notice of Allowance", U.S. Appl. No. 12/141,940, (May 21, 2013), 8 pages.

"Non-Final Office Action", U.S. Appl. No. 12/141,940, (Feb. 1, 2013), 15 pages.

"Final Office Action", U.S. Appl. No. 12/141,940, (Feb. 1, 2012),19 pages.

"Non-Final Office Action", U.S. Appl. No. 12/141,940, (Sep. 8, 2011),21 pages.

"Non-Final Office Action", U.S. Appl. No. 14/033,165, Dec. 3, 2014, 15 pages.

"Final Office Action", U.S. Appl. No. 14/033,165, Mar. 27, 2015, 16 pages.

\* cited by examiner

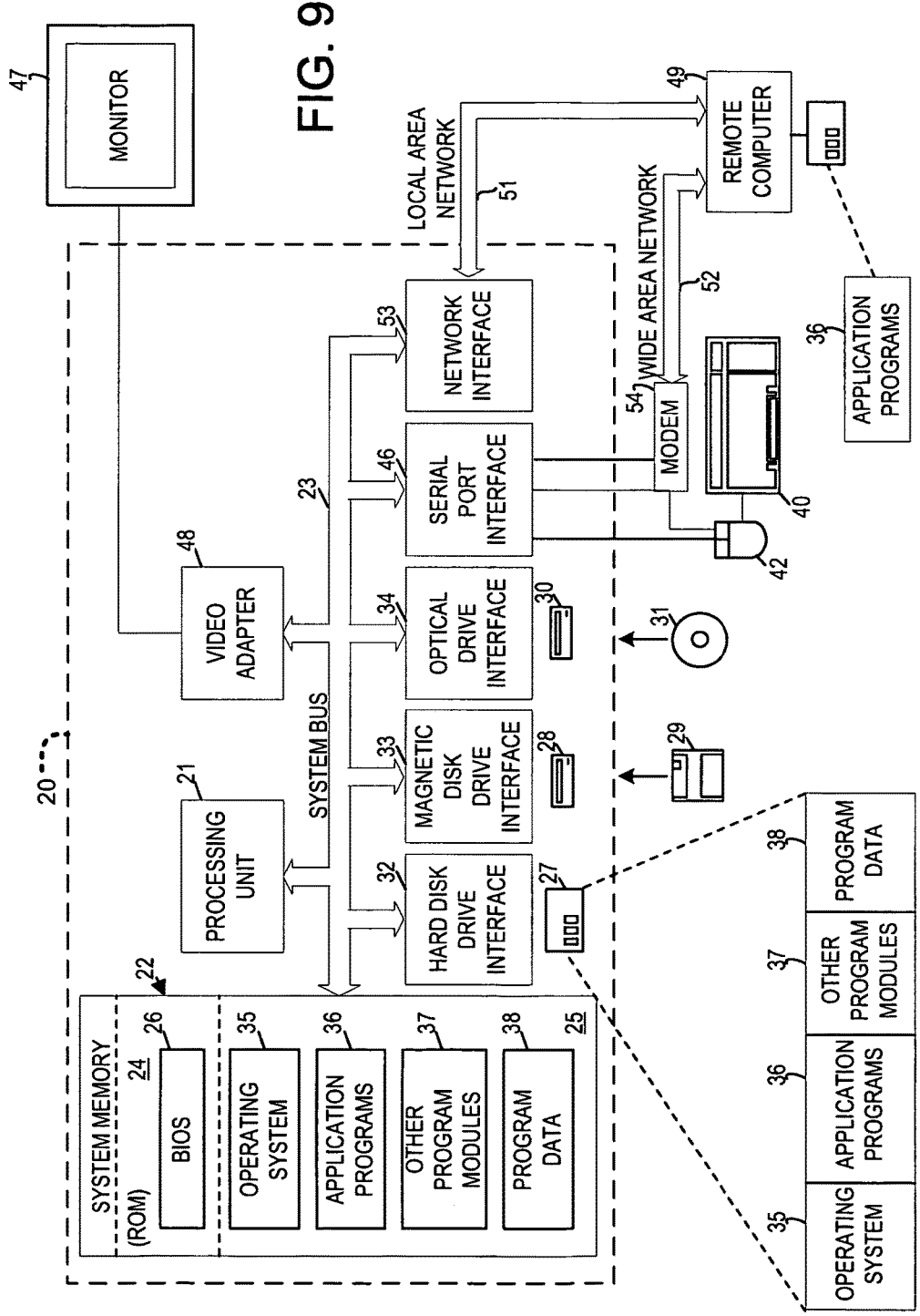

FEDERATED REALM DISCOVERY

CROSS-REFERENCE TO RELATED APPLICATIONS

This application is related to U.S. patent application Ser. No. 12/141,940, filed on Jun 19, 2008, entitled "FEDERATED REALM DISCOVERY," which issued as U.S. Pat. No. 8,544,074 on Sep. 24, 2013, which was filed concurrently herewith, and which is specifically incorporated herein by reference for all that it discloses or teaches.

BACKGROUND

In some online scenarios, a user may establish a user account to be used to access one or more network services or resources (collectively, "account network resources") within an account network. In support of this scenario, an account authority service (e.g., an "identity provider" or "security authority") provides a shared identity function that authenticates a single set of credentials to allow the user to access these account network resources. For example, by setting up an account with an account authority service, a user can configure a single set of credentials that can be used to access an email service, a calendaring service, an instant messaging service, a text messaging service, a blogging service, an online music service, a photosharing service, various e-commerce site, various remote devices, etc. within the account network. The term "account network" generally refers to the network of account network resources that have trust relationships with an account authority service.

In this context, a federated security architecture facilitates the use of a single set of credentials by providing mechanisms that enable authentication and authorization across different account networks. A federation is a collection of account authorities that have established trust among them. A realm corresponds to the smallest unit in a federation and represents a single unit of security administration or trust, such as a single organization. An account authority may support multiple realms. One of the simpler forms of a realm is a domain that represents an organization (e.g., CompanyXYZ.com). The levels of trust may vary but actions of a realm typically include authentication and almost always include authorization. A typical federation, for example, might include a number of organizations that have established trust for shared access to a set of resources. Federated security enables collaboration across multiple systems, networks, and organizations in different trust realms.

Typically, a user can sign into their appropriate account authority service (e.g., in their "home" realm) and receive a security token that can be used to access a desired network service. Furthermore, if the desired network service is in a different realm in the federation than the account authority service, the account authority service in one realm can send the appropriate security token for use in accessing the desired network service in the other realm, if the two realms have established a trust relationship. However, if a user attempts to access the network service before authenticating with an appropriate account authority service and/or before acquiring the security token, a challenge left to the network service is what to do to obtain the correct security token to allow access to the user (e.g., where to send the user to get the user's credentials validated). In addition, exposure of the user's credentials from one realm to entities in another realm presents security concerns, so it is undesirable to leave the authentication up to the network service or account authority service of the other realm. It remains a challenge to address these concerns, particularly without dramatically complicating or modifying the federated authentication user experience.

SUMMARY

Implementations described and claimed herein address the foregoing challenges within a federation by determining a "home" realm associated with a portion of the user's credentials before the user's secret information (such as a password) is passed to a non-home realm. A login user interface (UI) accepts a user identifier and, based on the user identifier, can use various methods to identify an account authority service of a "home" realm within the federation that can authenticate the user. In one method, a realm list of the user device can be used to direct the login to the appropriate home realm of the user. In another method, an account authority service in a non-home realm can look up the user's home realm and provide realm information directing the user device to the home realm, so that the user can be authenticated in the home realm.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

FIG. 9 illustrates an example system that may be useful in implementing the described technology.

DETAILED DESCRIPTIONS

Figure 1:
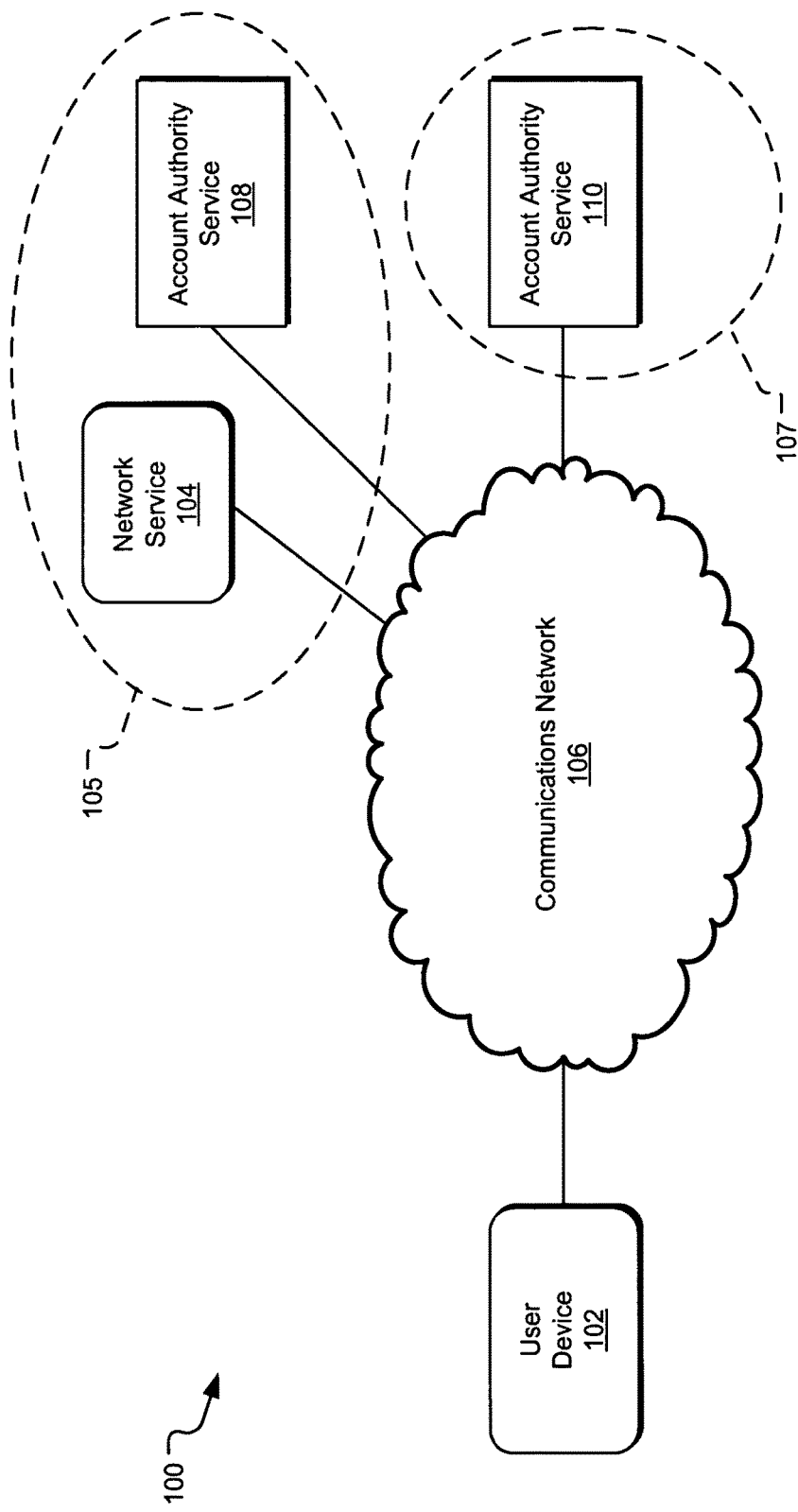
FIG. 1 illustrates an example system employing federated realm discovery.

FIG. 1 illustrates an example system 100 employing federated realm discovery. A user device 102 is operated by a user to access a network service 104 via a communications network 106. The network service 104 resides within the same realm 105 as an account authority service 108, which provides authentication functionality for the network service 104. For example, the network service 104 may represent an email service that has a trust relationship established with the account authority service 108. As such, a user may log into the account authority service 108 to obtain a security token that can be used to access the network service 104.

In the illustrated example, the user of FIG. 1 on the user device 102 does not have an account with the account authority service 108 but instead has an account with the account authority service 1 10, which resides in a different realm 107 that is a member of a federation with the realm 105 of account authority service 108. In this circumstance, the realm 107 of account authority service 110 is considered the user's home realm, and the realm 105 of the account authority service 108 is considered a non-home realm within the federation. It should be understood that both realms are members of the same federation and can include other network services (not shown) within them. Further, for the user of FIG. 1, the account authority service 108 is considered a home security authority, whereas the account authority service 110 is considered a non-home security authority within the federation. In addition, the user is termed a "security principal" and the user ID is termed a "security principal identifier".

In a federated security environment, the user can log into the account authority service 110, receive a security token from the account authority service 110, and use that security token to access the network service 104 (e.g., by getting the security token of the account authority service 110 translated into a security token accepted by the network service 104 of the account authority service 108).

However, it is a common user experience to access the network service 104 before logging into an account authority service and before obtaining a security token. In such circumstances, the network service 104 redirects the user's browser to the account authority service 108 of its realm 105, which issues a login UI to start the authentication process. Unfortunately, the login process with the login UI of the account authority service 108 will be unsuccessful if the user does not have an account with the account authority service 108. As such, the login UI of the account authority service 108 is a non-home login UI for the user. Furthermore, the account authority service 108 would prefer not to receive full user credentials (e.g., including a full user identifier (ID) and a user password) associated with a different realm. (e.g., in the interest of preserving the secrecy of such credentials). Therefore, the system 100 uses the user ID (e.g., a user name, email address, etc.) that the user enters into the login UI at the user device 102 to discover, if possible, the appropriate realm within the federation that can authenticate the user credentials, without receiving secret information such as the user's password. It should be understood that user credentials may take alternative formats and are not limited to a user ID and password pair. For example, other identifiers of a user may be employed including without limitation an information card, a smart card, a biometric scan, etc.

The illustration of FIG. 1 depicts a system 100 configured as a multi-site authentication system, in that the network service 104 uses a separate account authority service 108 in realm 105 to perform its authentication. In other configurations, a system may be configured as a single-site authentication system, in that the account authority service is integrated with the network service. In this case, no redirection to a network service's account authority service is required because both services reside or are accessible from the same URL. Note, however, that a user may still be redirected later to an account authority service of the user's home realm so that he or she can be authenticated within the federation employing the user's home realm.

Figure 2:
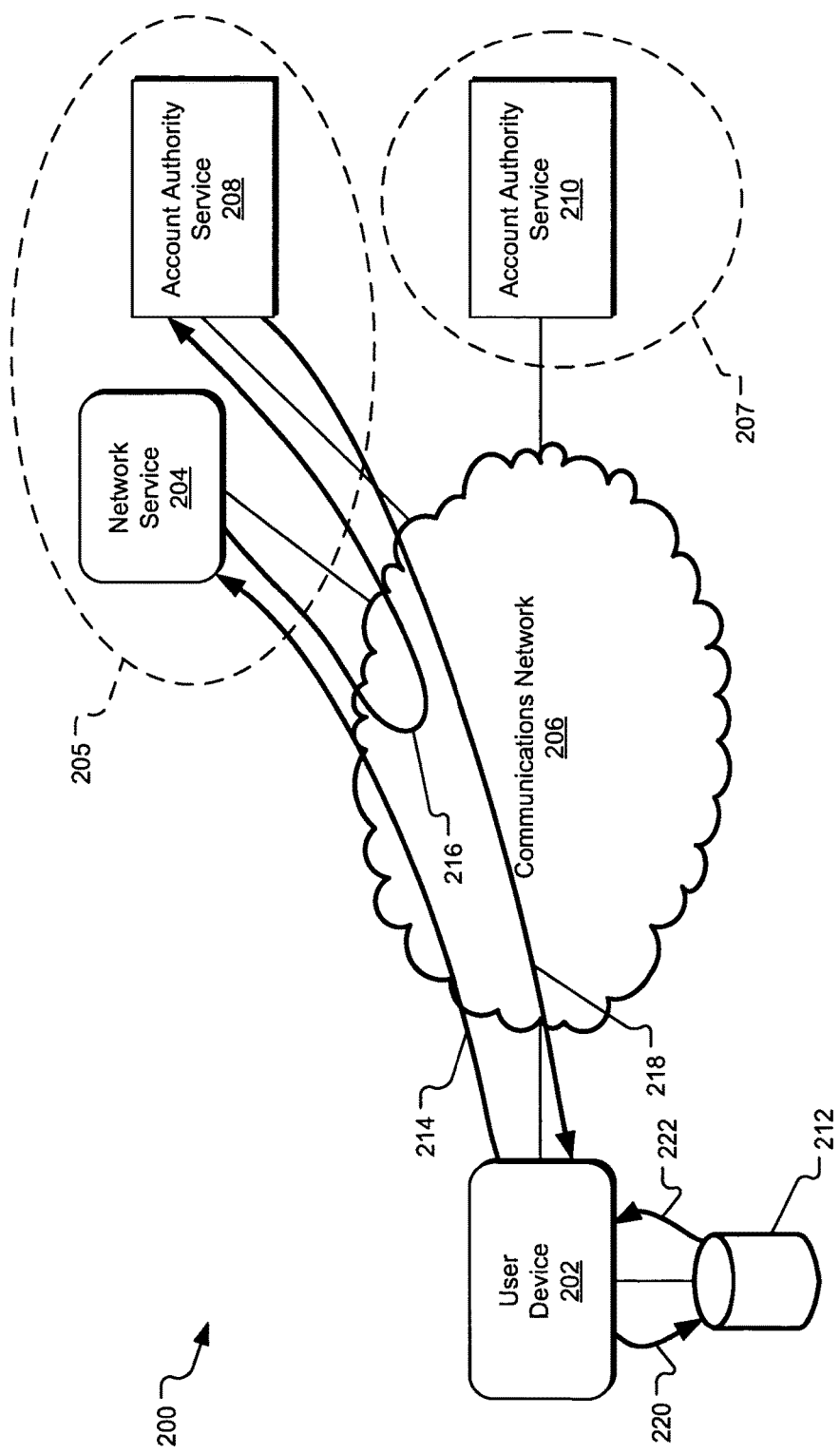
FIG. 2 illustrates example communications in a system employing federated realm discovery.

FIG. 2 illustrates example communications in a system 200 employing federated realm discovery. A user device 202 is operated by a user to access a network service 204 via a communications network 206. The network service 204 resides within the same realm 205 as an account authority service 208, which provides authentication functionality for the network service 204. The user of FIG. 2 does not have an account with the account authority service 208, so the realm 205 is considered a non-home realm for the user. Instead, the user has an account with an account authority service 210, which makes a realm 207 the user's home realm.

Having not yet obtained a security token, the user attempts to access the network service 204 via communications 214. The network service 204 recognizes that the user requires authentication and therefore redirects via communications 216 the user's browser to the account authority service 208 of its realm 205. The account authority service 208 then sends its login UI in communications 218 to the user device 202 to begin the authentication process. The login UI of the account authority service 208 is a non-home login UI for the user.

The user inputs his or her credentials (e.g., user name and password) into the login UI, but before the secret portion of these credentials (e.g., the password) are transmitted back to the account authority service 208, the system 200 attempts to discover an appropriate realm through which the user should log in (e.g., to discover the user's home realm). In one implementation, a realm list datastore 212 (e.g., a cookie store, a browser cache, a credential manager, etc.) is accessible to the user device 202 and stores previously-mapped realm assignments. The user device 202 accesses via communications 220 the realm list datastore 212 to inquire about a match for the user ID received through the login UI. If a match is found, the URL of the corresponding account authority service is returned to the user device 202 via communications 222. For example, if the user has logged into the account authority service 210 in previous sessions using a user ID "joe@first_realm.com", the user device 202 records a mapping between the "joe@first_realm.com" and a URL indicating the account authority service 210. As such, if the user types "joe@first_realm.com" into the login UI provided by the account authority service 208, the user device 202 can search the realm list datastore 212 for a match with a mapping entry. Note: It should be understood that the lookup may be executed on one or more portions of the user ID. For example, the lookup may be performed on "joe@first_realm", "first_realm", etc. The full user ID and portions thereof are collectively referred to as the "user ID".

If a mapping entry matching "joe@first_realm.com" is found, the user device 202 can prevent input of the user's password into the login UI provided by the account authority service 208. Alternatively, the user device 202 can prevent transmission of the user's password to the account authority service 208. Instead of sending the user's password to the account authority service 208, the user device 202 navigates to the account authority service indicated by the URL provided by the mapping (i.e., to account authority service 210) to request a login UI of that account authority service. The login UI of the account authority service 210 is a home login UI for the user.

It should be understood that the mapped URL for another user ID (i.e., for a user with realm 205 as his or her home realm) may instead indicate the account authority service 208, in which case the user device 202 merely continues accepting the user credentials through the login UI of the account authority service 208 and returns the user credentials to the account authority service 208 for authentication.

Figure 3:
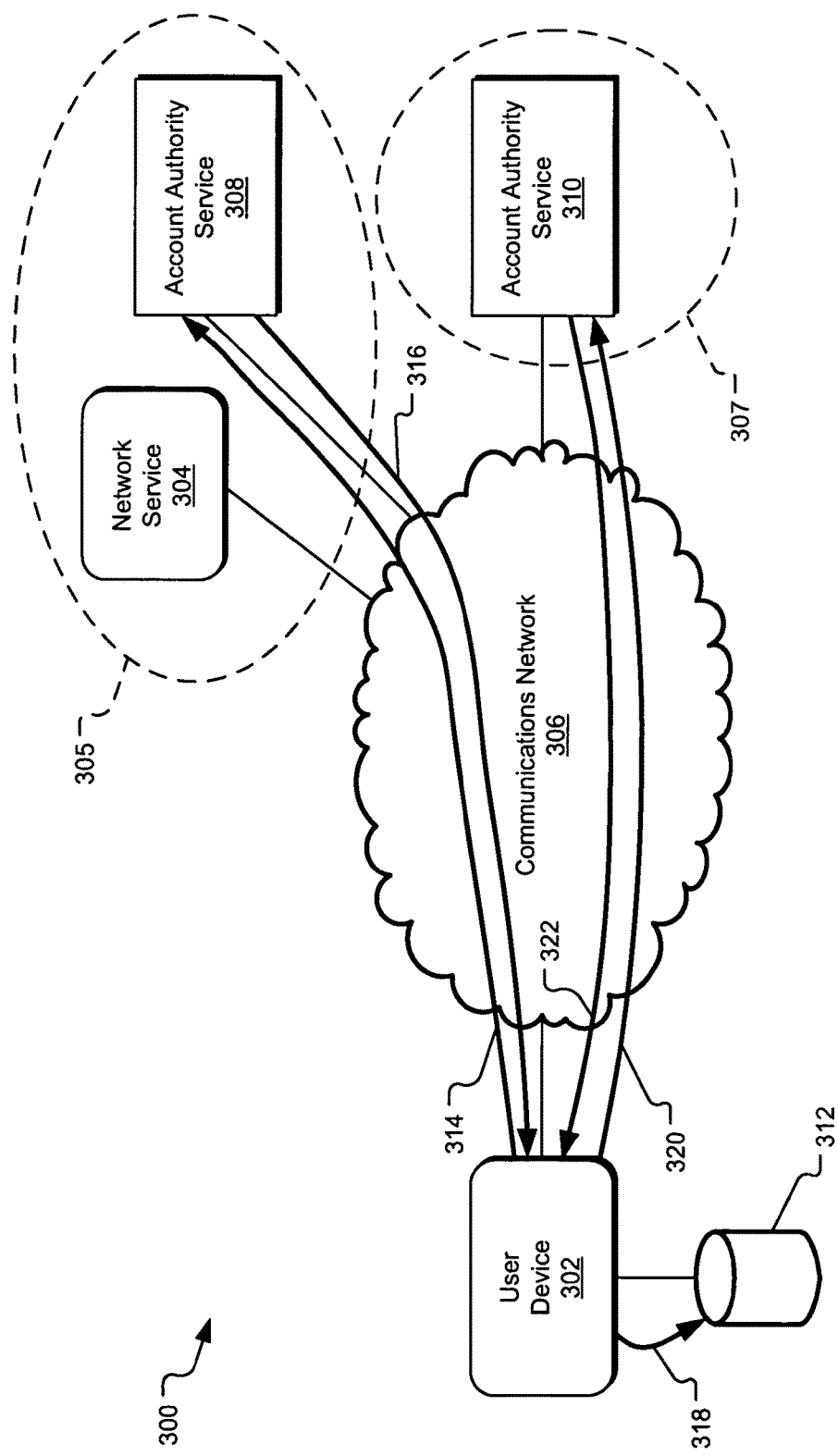
FIG. 3 illustrates additional example communications in a system employing federated realm discovery.

FIG. 3 illustrates additional example communications in a system 300 employing federated realm discovery. A user device 302 is operated by a user to access a network service 304 via a communications network 306. The network service 304 resides within the same realm 305 as an account authority service 308, which provides authentication functionality for the network service 304. The user of FIG. 3 does not have an account with the account authority service 308, so the realm 305 is considered a non-home realm for the user. Instead, the user has an account with an account authority service 310, which makes a realm 307 the user's home realm. For this illustration, it is assumed that a match was not found in a realm list datastore 312, which contains realm assignments known by the user device 302.

As such, the user device 302 may then send the user ID to the account authority service 308 in communications 314 to determine the appropriate realm in which the user should seek authentication. The account authority service 308 evaluates the user ID against a realm list, which may be recorded in a realm list datastore (not shown) that is accessible to the account authority service 308. As with the realm list datastore 312, the realm list datastore of the account authority service 308 records mappings between user IDs (or portions of user IDs, such as domain names) and realm information (e.g., URLs to one or more account authority servers associated with the home realm of each user ID). In one implementation, the process for establishing trust between different realms involves intercommunication of data about each realm, including for example a mapping between owned domain names and the URL where a security token can be obtained. Such a mapping can then be recorded in a realm list datastore, which can be accessed and updated over time.

The account authority service 308 accesses its realm list datastore to inquire about a match for the user ID received from the user device via communications 314. If a match is found, the realm information (e.g., the URL) of the corresponding account authority service is returned to the user device via communications 316. Note: It should be understood that the lookup may be executed on one or more portions of the user ID. The user device 302 stores the received realm information in its realm list datastore 312 for future sessions.

If a URL to a different account authority service is received, the user device 302 can prevent input of the user's password into the login UI provided by the account authority service 308. Alternatively, the user device 302 can prevent transmission of the user's password to the account authority service 308. Instead, the user device 302 navigates via communications 320 to the account authority service indicated by the URL provided by the mapping (i.e., to account authority service 310) to request a login UI of that account authority service. The account authority service 310 then returns its own login UI to the user device 302 via communications 322.

Figure 4:
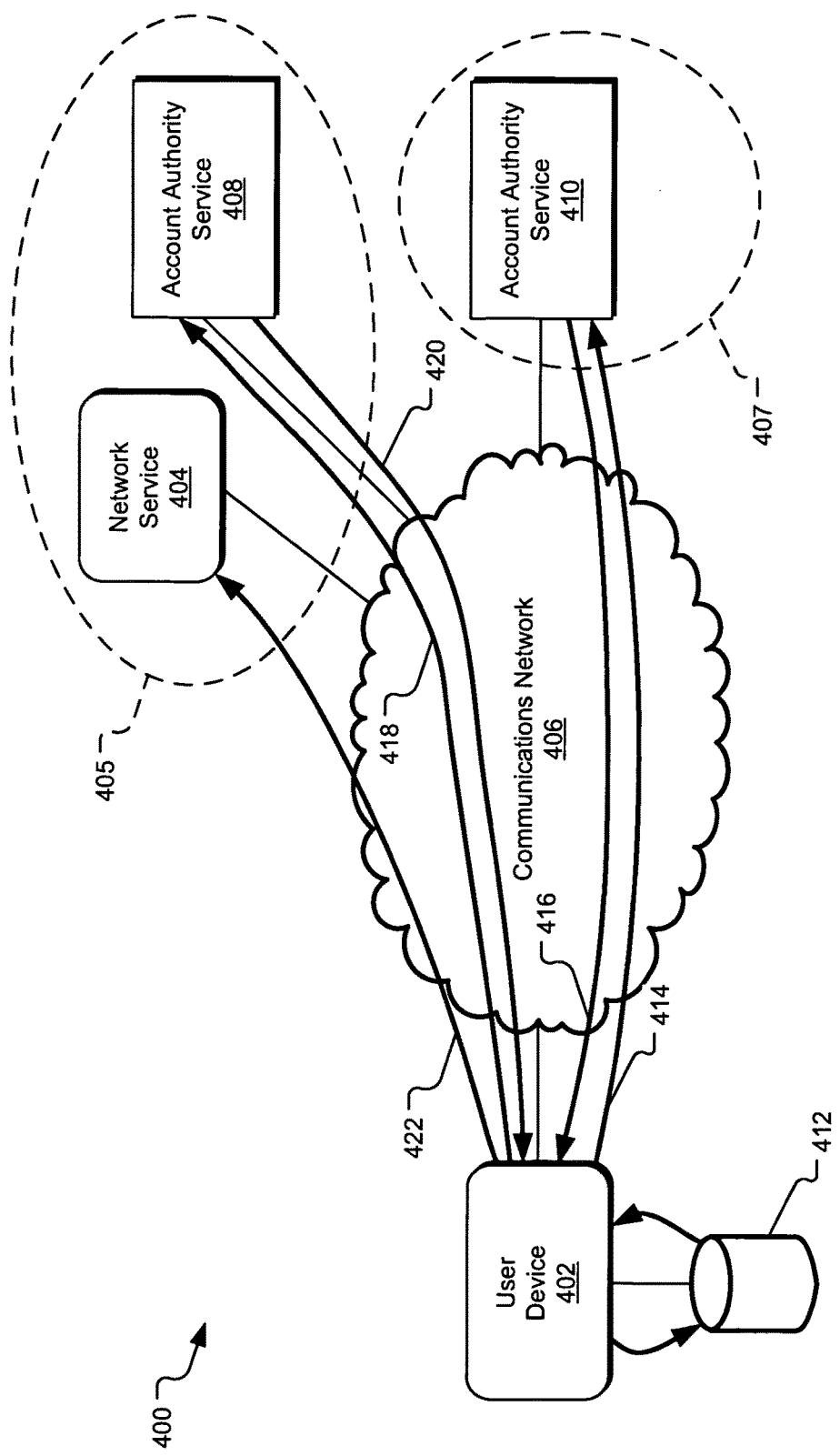
FIG. 4 illustrates additional example communications in a system employing a federated realm discovery cache.

FIG. 4 illustrates additional example communications in a system 400 employing a federated realm discovery cache. A user device 402 is operated by a user to access a network service 404 via a communications network 406. The network service 404 resides within the same realm 405 as an account authority service 408, which provides authentication functionality for the network service 404. The user of FIG. 4 does not have an account with the account authority service 408, so the realm 405 is considered a non-home realm for the user. Instead, the user has an account with an account authority service 410, which makes a realm 407 the user's home realm. For this illustration, the appropriate home realm of the user may have been discovered either through finding a match in the realm list datastore 412 or through finding a match in the realm list of an account authority service (such as account authority service 408). Furthermore, it is assumed that the account authority service 410 has already sent its login UI to the user device 402

The user enters his or her credentials through the login UI and sends the credentials to the account authority service 410 via communications 414, along with identification of the network service 404 or the account security service 408. The account authority service 410 authenticates the user and returns a security token via communications 416. The security token is in a format that account authority service 410 expects network service 404 and/or account authority service 408 to understand. If the user then attempts to access the network service 404, then the user device 402 sends the security token (termed a "partner security token" because it was obtained from a partner account authority service 410 in the federation) to the account authority service 408 in communications 418. The account authority service 408 accepts the partner security token, acknowledging that it represents evidence of authentication by a trusted partner in the federation, and therefore returns its own security token in communications 420 to allow the user device 402 to access the network service 404. In communications 422, the user device 402 sends the security token of the account authority service 408 to the network service 404 to obtained access.

Figure 5:
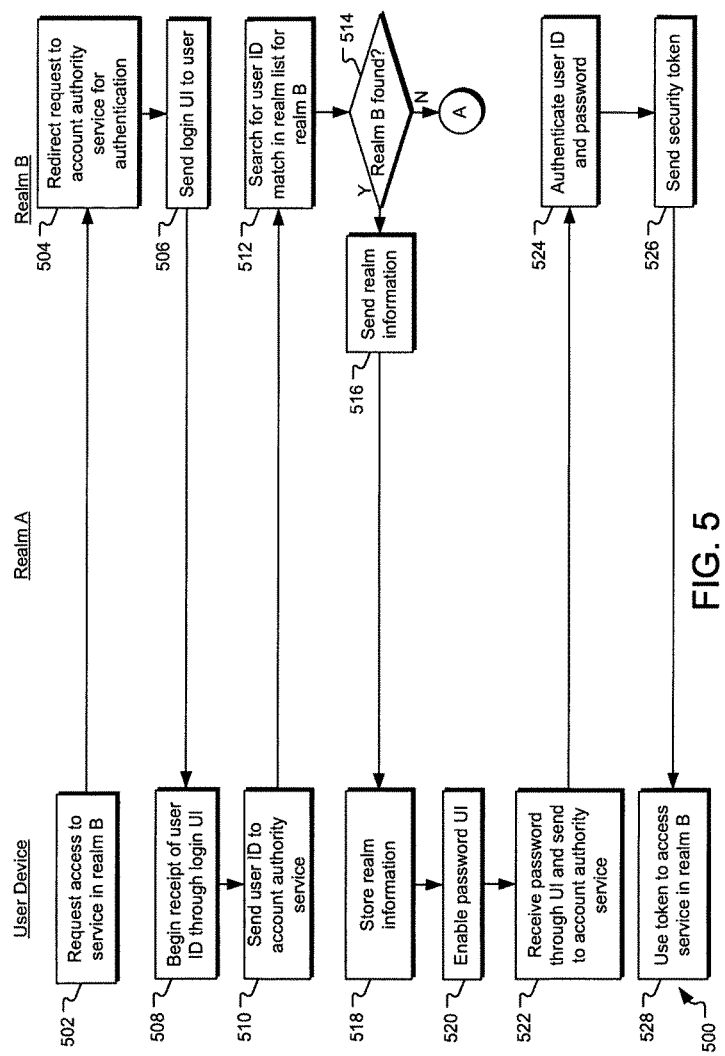
FIG. 5 illustrates example operations for implementing federated realm discovery.

FIG. 5 illustrates example operations 500 for implementing federated realm discovery. A request operation 502 issues a request from the user device for access to the network service in realm B. If the network service uses multi-site authentication, a redirecting operation 504 receives the request, determines that the user has not yet been authenticated, and redirects the user to an account authority service of realm B. Note: if the network service uses single site authentication, the account authority service of realm B co-resides with the network service and no redirection is necessary. A user interface operation 506 sends a login UI from the account authority service of realm B to the user device.

A receiving operation 508 receives the login UI, presents it to the user, and begins to receive the user's credentials through the login UI. In one implementation, a sending operation 510 sends the user ID of the user credentials to the account authority service of realm B, disabling input of or withholding transmission of the secret portion of the user credentials (e.g., a password). Furthermore the user ID may be a subset of all of the characters of the user ID, such as merely the alias or merely the domain name. A searching operation 512 searches for the user ID in the realm list for realm B. If a decision operation 514 determines that a match for realm B is found, the realm information (e.g., a URL to an account authority service of realm B) is returned to the user device by a sending operation 516. In this case, the home realm of the user would be identified as realm B.

A storage operation 518 stores the received realm information in a realm list datastore of the user device. In one implementation, an enabling operation 520 enables the password UI because it can now accept the password for realm B. A receiving operation 522 receives the password through the login UI and sends it to the account authority service of realm B for authentication with the user ID. An authentication operation 524 authenticates the user ID and password, and a sending operation 526 returns a security token to the user device. An access operation 528 allows the user device to access the network service in realm B using the security token.

In an alternative implementation, the user device does not disable input of the password in the sending operation 508. Instead, the user device merely withholds the password from the transmission to the account authority service of realm B. As such, at this time, the user device need not enable input of the password in the enabling operation 520. Instead, the receiving operation 522 merely sends the previously input password to the account authority service of realm B, if the match is found for realm B. Then processing proceeds with operations 524, 526, and 528.

Figure 6:
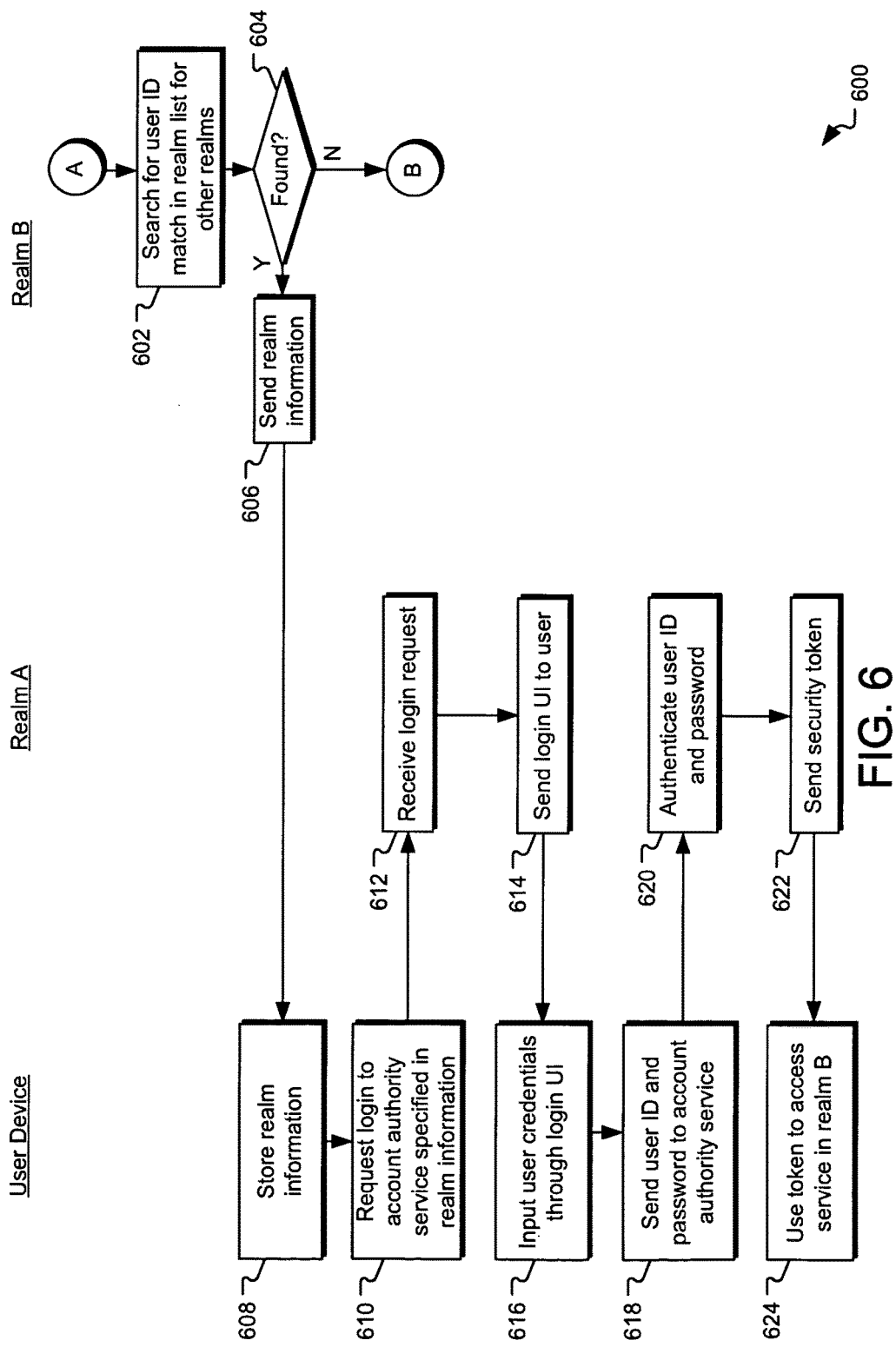
FIG. 6 illustrates additional example operations for implementing federated realm discovery.

If the decision operation 514 does not determine that match for realm B is found, processing proceeds through link A to operations described with regard to FIG. 6.

FIG. 6 illustrates additional example operations 600 for implementing federated realm discovery. Processing continues through link A from the operations described with regard to FIG. 5. A searching operation 602 searches for the user ID in the realm list for other realms. If a decision operation 604 determines that a match for another realm is found, the realm information (e.g., a URL to an account authority service of the other realm) is returned to the user device by a sending operation 606. In this case, the home realm of the user would be identified as realm A. A storing operation 608 stores the realm information in a realm list of the user device for future use.

A requesting operation 610 issues a login request to the account authority service of indicated by the received URL (i.e., an account authority service of realm A, which is the home realm of the user). A receiving operation 612 in realm A receives the login request from the user device. A user interface operation 614 sends a login UI to the user device. An input operation 616 receives the login UI, presents it to the user, and receives input of the user's credential. A sending operation 618 sends the user's credentials (e.g., including the user ID and the password) to the account authority service of realm A. An authentication operation 620 authenticates the user ID and password, and a sending operation 622 returns a security token (i.e., a partner security token) to the user device. An access operation 624 allows the user device to access the network service in realm B using the partner security token (e.g., by sending the partner security token to the account authority service of realm B, which provides its own security token that the user device can use to access the network service of realm B).

In an alternative implementation, the user ID and password collected in FIG. 5 can be sent directly to realm A's account authority, such that operations 610, 612, 614, and 616 can be skipped, thereby simplifying the user experience. In this manner, the user can enter user credentials into the non-home login UI and the authentication is automatically routed to the appropriate home realm of the user without sending the user credentials to the non-home account authority and without presenting the user with a separate login UI from the home realm.

Figure 7:
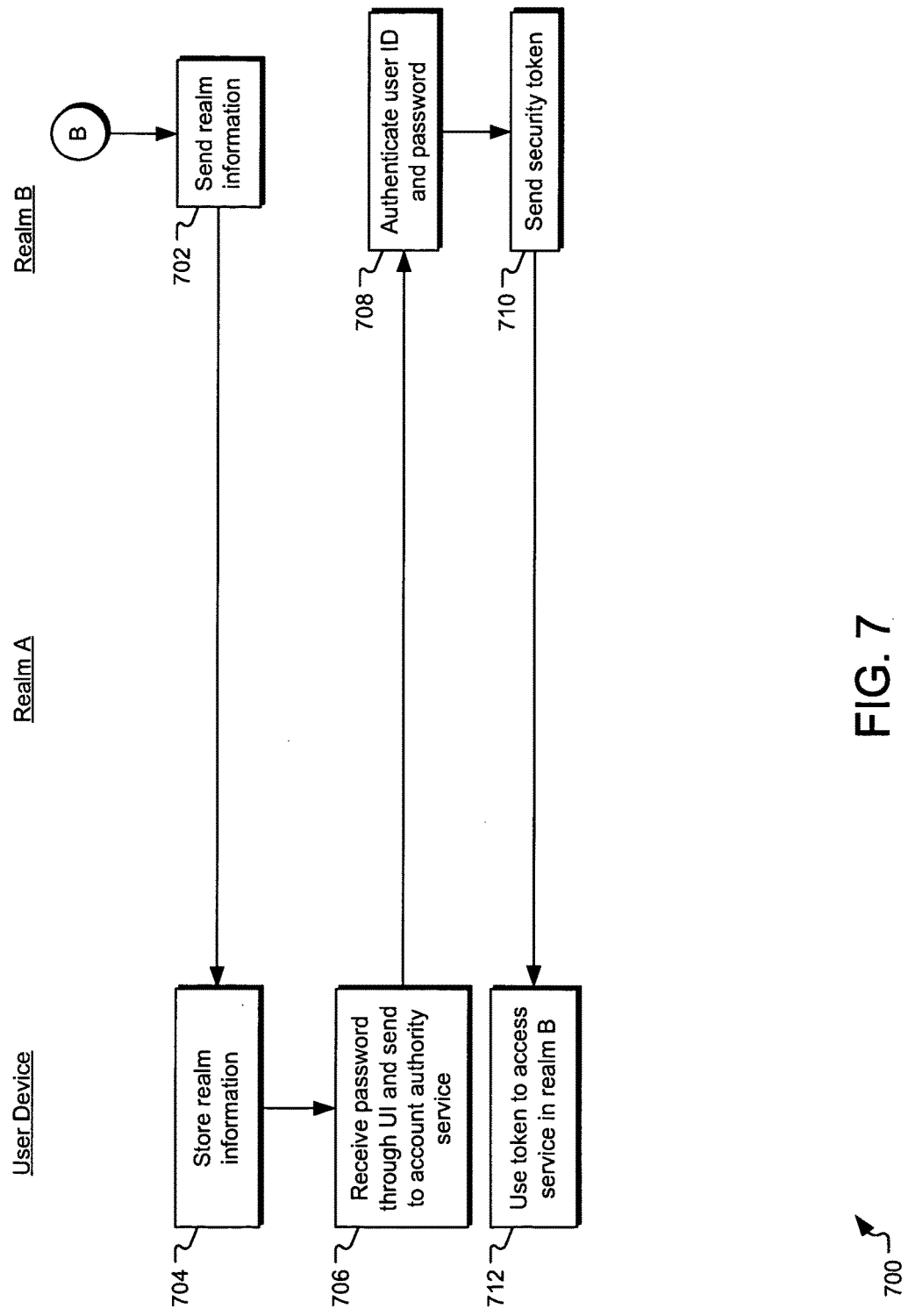
FIG. 7 illustrates additional example operations for implementing federated realm discovery.

If the decision operation 604 does not determine that match for another realm in the federation is found, processing proceeds through link B to operations described with regard to FIG.7.

FIG. 7 illustrates additional example operations 700 for implementing federated realm discovery. Processing continues through link B from the operations described with regard to FIG. 6. In this circumstance, the account authority service of realm B was unable to determine that it was the home realm of the user and was unable to identify a different realm as the home realm of the user. As such, the account authority service of realm B offers to log in the user using its standard login UI, which may lead to the user setting up a new account with the account authority service of realm B. Alternatively, the user may be prompted to re-enter the user ID, in case the user merely mis-typed the correct user ID or used the wrong user ID. As realm B as offered to become the home realm for the user, a sending operation 702 sends the realm information (e.g., a URL to an account authority service of realm B) to the user device.

A storage operation 704 stores the received realm information in a realm list datastore of the user device. In one implementation, a receiving operation 706 receives the password through the login UI and sends it to the account authority service of realm B for authentication with the user ID. An authentication operation 708 authenticates the user ID and password, and a sending operation 710 returns a security token to the user device. An access operation 712 allows the user device to access the network service in realm B using the security token.

In an alternative implementation, the user device does not disable input of the password in sending operation 508 of FIG. 5. Instead, the user device merely withholds the password from the transmission to the account authority service of realm B. As such, at this time, the user device need not enable input of the password in the receiving operation 706. Instead, the receiving operation 706 merely sends the previously input password to the account authority service of realm B.

In an alternative implementation, the user device checks its local realm list datastore before checking with the account authority service of the initial login UI it receives in the hope of finding a previously mapped realm assignment for the user ID received through the initial login UI. If this local check fails, the user device proceeds with the check with the account authority service, as described with regards to FIGS. 5, 6, and 7.

Figure 8:
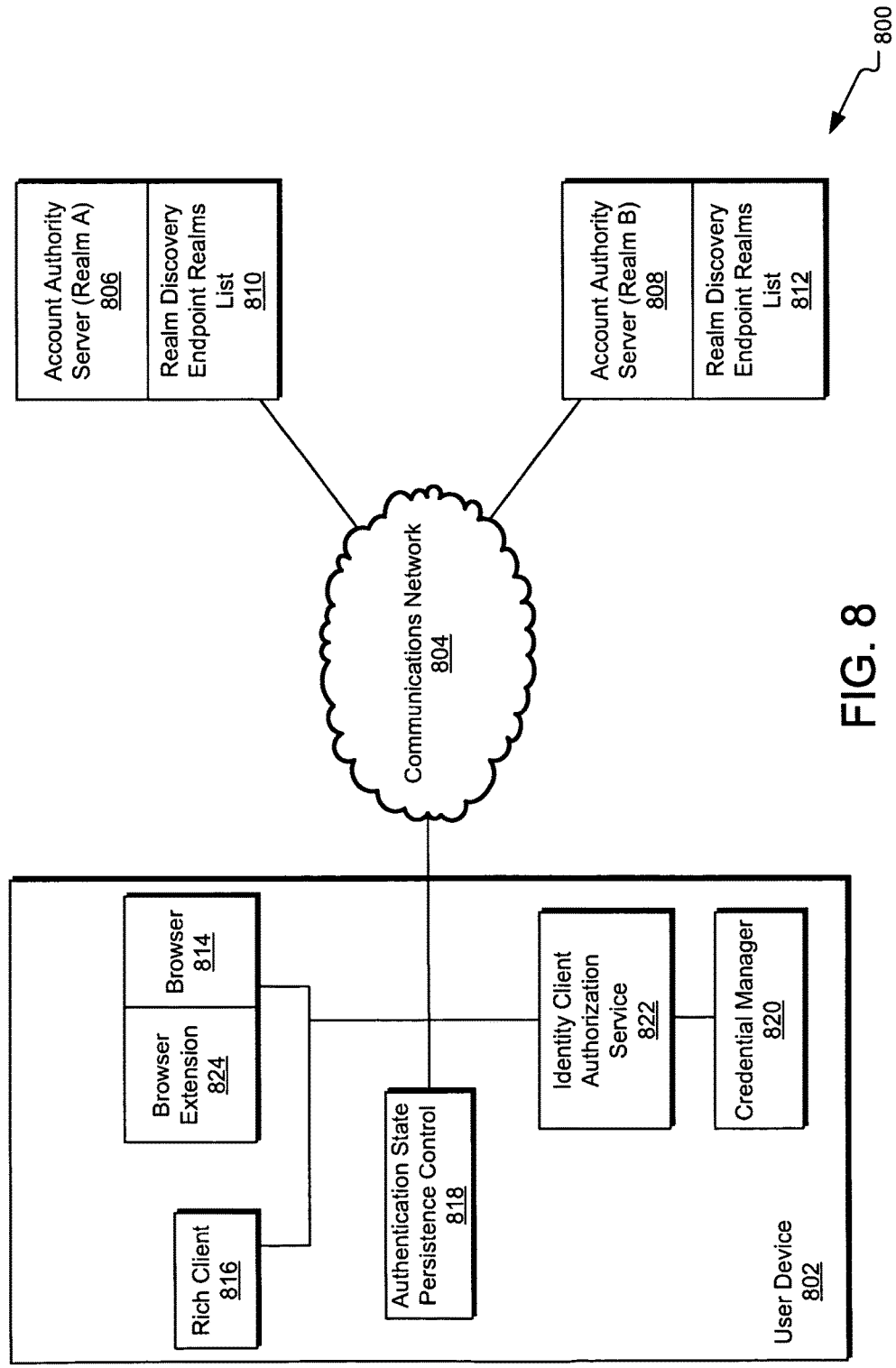
FIG. 8 illustrates example component modules in a system implementing federated realm discovery.

FIG. 8 illustrates example component modules in a system 800 implementing federated realm discovery. A user device 802 is coupled to a communications network 804 for communications with an account authority server 806 for realm A and an account authority server 808 for realm B. The account authority server in each realm has access to a realm list (labeled as Realm Discovery Endpoint Realms List). The account authority server 806 has access to the Realm Discovery Endpoint Realms List 810, and the account authority server 808 has access to the Realm Discovery Endpoint Realms List 812. Each realm list includes a mapping of a user identity (e.g., as identified by a user ID) to specific realm information, such as a URL, to the corresponding user's home realm account authority service.

The user device 802 includes a browser 814 and/or a rich client 816 (collectively referred to as the "client interface") that can be used to access network services in one or more realms. In one implementation, the browser 814 may be associated with a browser extension (e.g., a browser helper object, an Active X control, a Firefox extension, etc.) that stores realm information in a credential manager 820 or other realm list storage facility. Alternatively, the browser 814 can store realm information in its browser cookie cache (not shown).

Examples of a rich client may include an instant messaging client module, a web-based collaboration client module, a video conferencing client module, a telephony application module, etc. These rich clients can contain or can access program code that can store realm information in a credential manager 820 or other realm list storage facility.

A login UI received from an account authority service can be presented to a user through such client interfaces, which can also transmit some or all of the user credentials back to the account authority server via the communications network 804. After being transferred to the user device 802, the login UI asynchronously sends the user ID to an account authority server without sending the user's password to initiate federated realm discovery.

In a browser-based scenario, if the realm information of the home realm is returned to the user device 802, the browser 814 presenting the login UI writes the realm information and associated user IDs to a realm list datastore (e.g., to a credential manager 820 via a browser extension 824 or an authentication state persistence control 818, or to cookies using typical browser capabilities, etc.). In addition, if the user device 802 receives realm information directing login to a different account authority server, the login UI redirects the browser to the URL of the new account authority server.

Generally, the browser extension 824 or the authentication state persistence control 818 interacts with the identity client authorization service 822 of the user device 802 to write and read realm information and associated user IDs to and from a local realm list datastore, such as credential manager 820. The client-side authentication state persistence control 818 (such as an Active X control) can also be instantiated on the federated account authority servers 806 and 808 and pushed to the user device 802 with the login UI. When executed, the persistence control 818 can store the authentication state (associated with the user's login with the home realm) to the realm list datastore (e.g., the credential manager 820 or cookies) at the user device 802. Alternatively, the browser 814 can write and read realm information to and from its browser cookie cache.

The browser extension 824 or the authentication state persistence control 818 helps to share the realm discovery and realm list datastore between the browser 814 and the rich client 816 by centralizing the realm information and associated user IDs in a local realm list datastore accessible by both the browser extension 824/authentication state persistence control 818 and the rich client 816. Accordingly, caching the home realms of users in the local realm list datastore improves performance by thereafter replacing the more expensive discovery procedure of resolving the home realm using the non-home account authority. Realm information and user IDs stored in cookies not likely to be shared (although they may be), but nevertheless, a local cookie-based realm list datastore can still improve performance.

In the rich-client-based scenario, if the realm information of the home realm is returned to the user device 802, the rich client 816 presenting the login UI writes the realm information and associated user IDs to a realm list datastore (e.g., to a credential manager 820, etc.) using its own functionality or leveraging other related functionality (e.g., using program code from a security library). As such, if the client interface accessing the service or presenting the login UI is a rich client application, the rich client can perform the realm discovery using an identity client authorization service 822 to search the local realm list datastore, such as the credential manager 820, and sending the realm discovery requests (e.g., with the user ID) to the account authority server. In addition, if the user device 802 receives realm information directing login to a different account authority server, the rich client 816 accesses the new account authority server at the URL provided in the realm information.

In an alternative implementation, an example computing system environment may employ directory services that provide central authorization and authentication functionality. In this scenario, realm discovery and federated authentication may execute transparently or silently to the user's perceptions. For example, the user's device can receive a system security token in response to an authentication request it sends to directory services (e.g., when the user first signs into his or her enterprise network). Furthermore, the identity client authorization service 822 can detect that the user is signed into directory services. Because the user is already signed into directory services, the identity client authorization service 822 can then silently (i.e., without interrupting the user with another login UI or prompt) perform realm discovery by sending a realm discovery request (including a least a portion of the user ID from the domain-joined credentials) to an account authority service associated with the directory services. This account authority service returns the realm information for the user (if available), and the identity client authorization service 822 stores the realm information and the associated user ID into the local realm list datastore.

Thereafter, having obtained the system security token and having identified the user's home realm, the identity client authorization service 822 can submit the system security token to the identified home account authority service to obtain a partner security token, which is stored for future use by the identity client authorization service 822.

As such, when the user visits a network service in a different realm within the federation, the identity client authorization service 822 sends the silently-obtained partner security token to the account authority service associated with the network service. This account authority service can then issue a security token for the network service without any need for the user to enter additional credential input through another login UI. Accordingly, using domain-joined credentials and the system security token received from directory services, the user device can obtain and use the security token for the network service in a non-home realm without confronting the user with a login UI from the home realm or from any realm for that matter.

The example hardware and operating environment of FIG. 9 for implementing the invention includes a computing device, such as general purpose computing device in the form of a gaming console or computer 20, a mobile telephone, a personal data assistant (PDA), a set top box, or other type of computing device. In the implementation of FIG. 9, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, removable optical disk 31, ROM 24, or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via a display interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 9. The logical connections depicted in FIG. 9 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the computer 20, or portions thereof, may be stored in the remote memory storage device. It is appreciated that the network connections shown are example and other means of and communications devices for establishing a communications link between the computers may be used.

In an example implementation, an account authority service module, an authentication state persistence control, a browser helper object, a rich client, a browser, and other modules may be embodied by instructions stored in memory 22 and/or storage devices 29 or 31 and processed by the processing unit 21. A user credentials, realm lists, cookies, security tokens, and other data may be stored in memory 22 and/or storage devices 29 or 31 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

What is claimed is:

1. A method comprising:

receiving, at a user device and via a non-home security authority login user interface implemented at the user device, user credentials of a user, the user credentials comprising at least an identifier of the user and a password;

requesting, by the user device, identification of a home security authority of the user based on the user credentials by accessing a realm list datastore of the user device, the user device having an account with the home security authority but not with the non-home security authority;

responsive to said requesting, receiving the identification of the home security authority of the user; and requesting authentication for the user to access the non-home security authority from the identified home security authority of the user without sending the user credentials to the non-home security authority.

2. The method of claim 1 wherein the non-home security authority and the home security authority are members of a federation.

3. The method of claim 1 further comprising receiving a security token from the identified home security authority for access by the user to a network service.

4. The method of claim 1 wherein requesting identification further comprises sending a request via a communications network to the non-home security authority, the request not including a secret credential of the user credentials of the user, the request requesting the non-home security authority to identify the home security authority of the user.

5. The method of claim 1 wherein the requesting identification further comprises sending a request via a communications network to the non-home security authority, prior to receipt of all of characters of the user credentials.

6. The method of claim 1 wherein the requesting comprises sending a request via a communications network to the non-home security authority, prior to receipt of a secret credential of the user credentials by the login user interface.

7. A computer-readable storage device having computer executable instructions for performing a computer process, the computer process comprising:

presenting to a user a login user interface for a non-home security authority within a federation, the non-home security authority and a home security authority being members of the federation, the user having an account with the home security authority but not with the non-home security authority;

receiving, via the login user interface for the non-home security authority, user credentials of the user, the user credentials comprising at least a portion of a user identifier unique to the user, said receiving performed independent of transmitting the user credentials to the non-home security authority;

requesting identification of the home security authority of the user based on the user credentials from a realm list datastore;

responsive to the requesting, receiving identification of the home security authority of the user; and transmitting the user credentials of the user, including the user identifier and associated secret information of the user, to the identified home security authority to request authentication for the user to access the non-home security authority without transmitting the associated secret information of the user to the non-home security authority.

8. The computer-readable storage device of claim 7 wherein the receiving operation receives the user credentials of the user through the login user interface from the non-home security authority but does not transmit the associated secret information of the user to the non-home security authority.

9. The computer-readable storage device of claim 7 wherein the computer process further comprises receiving a security token from the identified home security authority for access by the user to a network service.

10. The computer-readable storage device of claim 7 wherein the requesting further comprises sending a request via a communications network to the non-home security authority, the request including the at least a portion of the user identifier and not including the associated secret information of the user, the request requesting the non-home security authority to identify the home security authority of the user.

11. The computer-readable storage device of claim 7 wherein the requesting further comprises sending a request via a communications network to the non-home security authority, prior to receipt of all of characters of the user identifier.

12. The computer-readable storage device of claim 7 wherein the requesting further comprises sending a request via a communications network to the non-home security authority, prior to receipt of a secret credential of the user by the login user interface.

13. The method of claim 1 wherein requesting authentication further comprises requesting authentication from the identified home security authority of the user without presenting the user with a separate login user interface from the home security authority.

14. The computer-readable storage device of claim 7 wherein transmitting the user credentials further comprises transmitting the user credentials of the user to the identified home security authority without presenting the user with a separate login user interface from the home security authority.

* * * * *